(12) United States Patent
Eickhoff

(10) Patent No.: US 9,276,280 B2
(45) Date of Patent: Mar. 1, 2016

(54) POWER GENERATION VIA COMBINED FUEL THERMOLYSIS AND HYDROLYSIS

(75) Inventor: Steven J. Eickhoff, Brooklyn Park, MN (US)

(73) Assignee: Honeywell International Inc., Morristown, NJ (US)

(*) Notice: Subject to any disclaimer, the term of this patent is extended or adjusted under 35 U.S.C. 154(b) by 895 days.

(21) Appl. No.: 13/436,360

(22) Filed: Mar. 30, 2012

(65) Prior Publication Data

US 2013/0260270 A1    Oct. 3, 2013

(51) Int. Cl.
*H01M 8/06* (2006.01)
*H01M 8/04* (2006.01)

(52) U.S. Cl.
CPC ........ *H01M 8/0625* (2013.01); *H01M 8/04037* (2013.01); *H01M 8/0441* (2013.01); *H01M 8/04164* (2013.01); *H01M 8/04208* (2013.01); *H01M 8/04365* (2013.01); *H01M 8/04507* (2013.01); *H01M 8/04611* (2013.01); *H01M 8/04738* (2013.01); *H01M 8/04753* (2013.01); *H01M 8/04216* (2013.01); *Y02E 60/50* (2013.01)

(58) Field of Classification Search
CPC ..................... H01M 8/04037; H01M 8/04164; H01M 8/04208; H01M 8/04216; H01M 8/04365; H01M 8/0441; H01M 8/04507; H01M 8/04611; H01M 8/04738; H01M 8/04753; H01M 8/0625
See application file for complete search history.

(56) References Cited

U.S. PATENT DOCUMENTS

| | | | |
|---|---|---|---|
| 2002/0114983 A1* | 8/2002 | Frank et al. | 429/9 |
| 2004/0016769 A1* | 1/2004 | Redmond | 222/3 |
| 2004/0197620 A1* | 10/2004 | Arthur | 429/22 |
| 2005/0136300 A1* | 6/2005 | Dyer | 429/19 |
| 2005/0260473 A1* | 11/2005 | Wang | 429/33 |
| 2007/0104996 A1* | 5/2007 | Eickhoff et al. | 429/34 |
| 2008/0268303 A1* | 10/2008 | Eickhoff | 429/19 |

* cited by examiner

*Primary Examiner* — Carlos Barcena
(74) *Attorney, Agent, or Firm* — Brooks, Cameron & Huebsch, PLLC

(57) ABSTRACT

Devices and methods for power generation via combined fuel thermolysis and hydrolysis are described herein. For example, one or more embodiments include a housing that includes an air intake, a fuel cartridge adapted to be removably placed within the housing, wherein the fuel cartridge includes a heating element configured to heat a fuel located in the fuel cartridge to cause a release of hydrogen from the fuel, an air conduit disposed about the fuel cartridge in the housing, wherein the air conduit includes a fuel cell portion and a water vapor permeable, hydrogen impermeable membrane portion, and the air conduit is configured to direct oxygen from the air intake to the fuel cell portion and to carry water vapor generated by the fuel cell portion past the membrane portion such that water vapor passes through the membrane portion and causes release of hydrogen from the fuel cartridge.

21 Claims, 6 Drawing Sheets

POWER GENERATION VIA COMBINED FUEL THERMOLYSIS AND HYDROLYSIS

TECHNICAL FIELD

The present disclosure relates to power generation via combined fuel thermolysis and hydrolysis.

BACKGROUND

As portable electronic devices evolve, power demands associated with these devices can increase due to their increased functionality and/or complexity. Prior approaches have attempted to power portable electronic devices through rechargeable batteries. However, challenges can be associated with the use of rechargeable batteries. These challenges can include, for example, environmental concerns, inadequate energy density for powering portable electronic devices, and/or the need to recharge the batteries often.

Other prior approaches have attempted to use hydrogen generators to provide hydrogen for a fuel cell for powering portable electronic devices. However, challenges can exist with hydrogen generators due to a low energy density associated with the hydrogen generator and/or low power density.

DETAILED DESCRIPTION

Figure 1A:
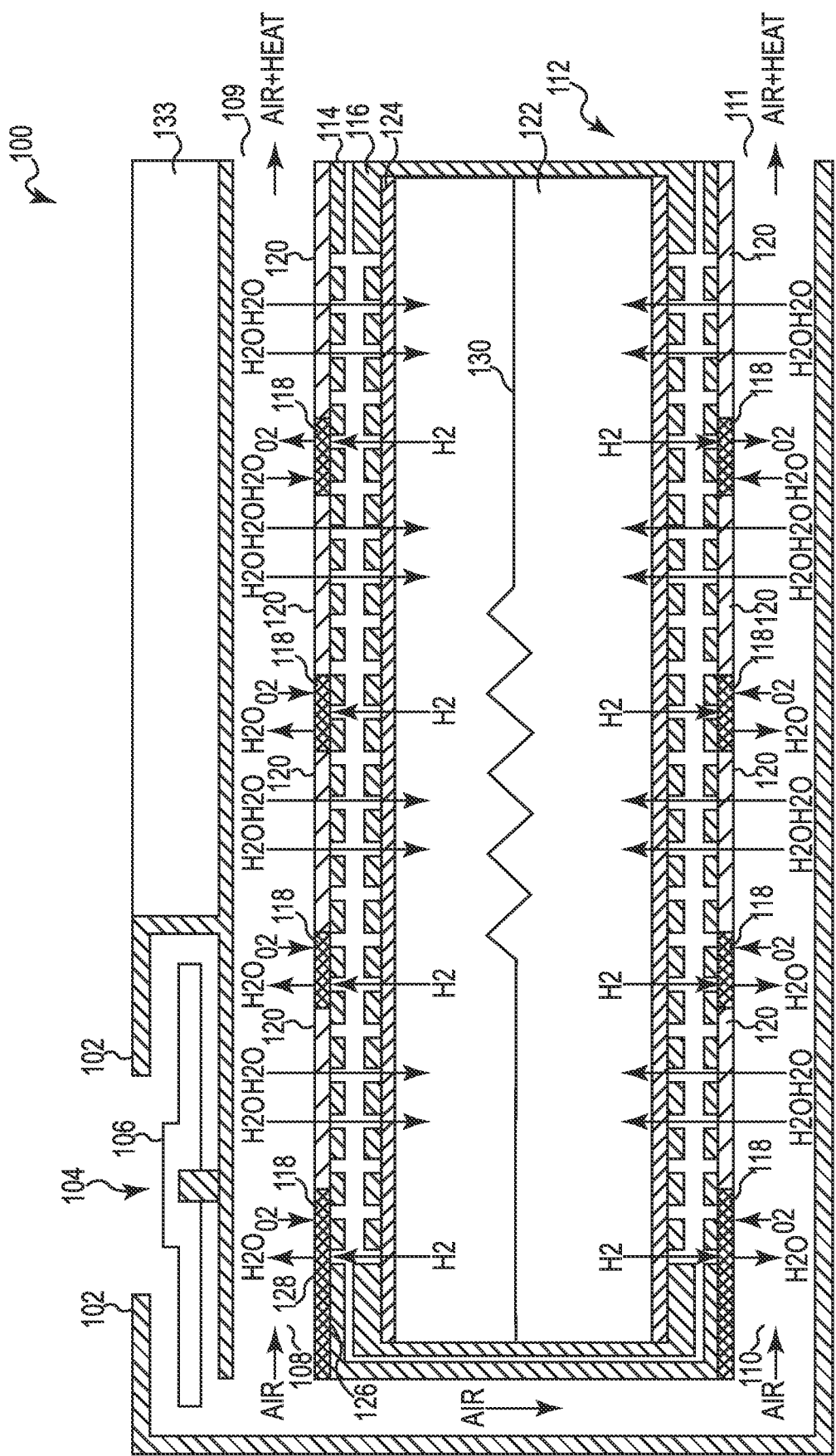
FIG. 1A illustrates a cross-sectional view of a power generator according to one or more embodiments of the present disclosure.

Devices and methods for power generation via combined fuel thermolysis and hydrolysis are described herein. For example, one or more embodiments include a housing that includes an air intake, a fuel cartridge adapted to be removably placed within the housing, wherein the fuel cartridge includes a heating element configured to heat a fuel located in the fuel cartridge to cause a release of hydrogen from the fuel, an air conduit disposed about the fuel cartridge in the housing, wherein the air conduit includes a fuel cell portion and a water vapor permeable, hydrogen impermeable membrane portion, and the air conduit is configured to direct oxygen from the air intake to the fuel cell portion and to carry water vapor generated by the fuel cell portion past the membrane portion such that water vapor passes through the membrane portion and causes release of hydrogen from the fuel cartridge.

Some embodiments of the present disclosure can provide a power generator that offers an improved energy density and power density. In an example, the power generator can provide an improved power density by heating a fuel in a removable fuel cartridge to produce hydrogen via thermolysis. Alternatively, and/or in addition, the power generator can provide an improved energy density by providing water to the fuel in the removable fuel cartridge to produce hydrogen via hydrolysis.

In some embodiments, the power generator can provide an improved power density through thermolysis. Thermolysis can be defined as a chemical decomposition caused by heat. For instance, heating of a fuel, such as $LiAlH_4$, can decompose the fuel into $2H_2$. Thermolysis can occur at a faster rate than hydrolysis, thus improving a power density of a power generator that only operates via hydrolysis.

In some embodiments, the power generator can increase or decrease production of electricity on demand via thermolysis. In an example, upon an increased demand for electricity, a heater controller can energize the heating elements to start thermolysis and produce hydrogen for a fuel cell. Alternatively, and/or in addition, upon a decreased demand for electricity, the heater controller can de-energize the heating elements to stop and/or slow thermolysis to conserve the hydrogen within the fuel.

In some embodiments, the power generator can provide an improved energy density through hydrolysis. Hydrolysis can be defined as the chemical reaction of a fuel with water, which results in the production of hydrogen. For instance, exposing the fuel, such as $LiAlH_4$, to water can result in formation of $4H_2$ and reaction products (e.g., $Al(OH)_3$, $LiOH$). As such, hydrolysis can produce a greater amount of hydrogen than thermolysis. Accordingly, hydrolysis can provide an improved energy density versus thermolysis.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1A, and a similar element may be referenced as 202 in FIG. 2.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

FIG. 1A illustrates a power generator according to one or more embodiments of the present disclosure. The power generator 100 can include a housing 102 that includes an air intake 104. In an example, the air intake 104 can include a fan 106 positioned in the air intake 104. The fan can direct air (e.g., oxygen ($O_2$), water vapor ($H_2O$)) through air conduit 108, 110. The air conduit 108, 110 can be disposed about a fuel cartridge 112 in the housing 102.

The fuel cartridge 112 can be adapted to be removably placed within the housing 102. In an example, the fuel cartridge 112 can slide into or out of the housing 102 and can be secured within a receptacle 114. Securing the fuel cartridge 112 within the receptacle 114 can be accomplished through a friction fit between the receptacle 114 and a shell 116 of the fuel cartridge 112. The fitment between the fuel cartridge 112 and the receptacle 114 can be maintained through use of a gasket (e.g., rubber o-ring) between the shell 116 of the fuel cartridge 112 and the receptacle 114. Alternatively, and/or in addition, a latch can hold the fuel cartridge 112 within the receptacle 114.

On both sides of the fuel cartridge 112, air conduit 108, 110 can include a fuel cell portion 118 and a selectively permeable membrane 120. In an example, the air conduit 108, 110 can be configured to direct oxygen from the air intake 104 to the fuel cell portion 118 and water vapor from the air intake 104 to the selectively permeable membrane 120.

The selectively permeable membrane 120 can be formed from a water vapor permeable, hydrogen impermeable membrane. For example, water vapor can permeate through the selectively permeable membrane while the selectively permeable characteristics of the membrane prevent the permeation of hydrogen.

The selectively permeable membrane 120 can allow water vapor to enter fuel cartridge 112 and contact a fuel 122 in the fuel cartridge 112, which may be encapsulted in a particulate filter 124. The fuel 122 can be a hydride. In an example, the fuel can be $LiAlH_4$, $NaAlH_4$, $KAlH_4$, $MgAlH_4$, $CaH_2$, $LiBH_4$, $NaBH_4$, $LiH$, and $MgH_2$, alkali metals, alkaline earth metals, and/or alkali metal silicides, although examples are not so limited. $NaAlH_4$ may provide a good cost/performance balance, while a hydride including Li may provide for desirable recycling of spent hydride.

Upon exposing the fuel 122 to water, hydrogen can be produced via hydrolysis. In an example, the selectively permeable membranes 120 can prevent hydrogen from traversing back through the membranes 120.

The fuel cell portion 118 can consume the hydrogen produced via hydrolysis as well as oxygen from the air conduit 108, 110 to produce electricity. In an example, hydrogen generated in the fuel cartridge 112 via hydrolysis can be consumed at an anode 126 of the fuel cell portion 118 while oxygen in the air is consumed at a cathode 128 of the fuel cell portion 118.

The fuel cell portion 118 can produce water vapor and heat when reacting with the hydrogen and oxygen, as well as electricity. The water vapor and heat can be carried downstream by the air driven by fan 106. Some of the water vapor may proceed back to the fuel cartridge 112 for use in generating more hydrogen. For example, the selectively permeable membrane portion 120 can allow the water vapor to enter the fuel cartridge 112 and contact the fuel 122 in the fuel cartridge 112.

In an example, the air conduit 108, 110 can be configured to carry the water vapor generated by the fuel cell portion 118 past the selectively permeable membrane portion 120 such that water vapor passes through the selectively permeable membrane portion 120 and causes release of hydrogen from the fuel cartridge 112. Alternatively, and/or in addition, air conduit 108, 110 can be configured to direct heat generated from the reaction of the hydrogen and oxygen with the fuel cell portion 118 away from the fuel cartridge 112 and out exhaust opening 132.

In some embodiments, the volume of air directed through the air conduit 108, 110 can be variable. For example, a speed of the fan 106 can be increased or decreased via a controller coupled to the fan 106 and configured to control the operation of the fan 106. The controller can control the operation of the fan 106 based on outputs from a number of sensors in communication with the controller. Sensors can include pressure, relative humidity, and/or temperature sensors.

In some embodiments, a pressure sensor can be disposed at a location within the fuel cartridge 112. Alternatively, and/or in addition, temperature and relative humidity sensors can be disposed at a location within the power generator 100, such as at the air intake 104, air conduit 108, 110, and/or exhaust outlet 109, 111.

In some embodiments, the fan controller can control operation of the fan 106 based on an electricity demand and/or an amount of electricity produced by the power generator 100. In an example, the power generator can include a sensor to detect an electricity demand and/or electricity production. For instance, upon detection of an increased demand for electricity, the fan controller can increase a speed of the fan 106 to increase the volume of air passed through the air conduit 108, 110, thus increasing an amount of water vapor permeating through the semipermeable membrane 120, which can result in an increased production of hydrogen.

In some embodiments, the fuel cartridge 112 can include a heating element 130 configured to heat the fuel 122 located in the fuel cartridge 112 to cause a release of hydrogen from the fuel 122. In an example, the heating element 130 can be a resistive heater. The fuel cartridge 112 can include any number of resistive heaters. For instance, the fuel cartridge 112 can include a number of heating elements 130 arranged in a pattern that provides a uniform heating of the fuel 122 in the fuel cartridge 112.

The heating element 130 can heat the fuel 122 to decompose the fuel 122 and form hydrogen. Upon formation, the hydrogen can pass through the particulate filter 124 and can be consumed at the anode 126 of the fuel cell 118 along with oxygen at the cathode 128 of the fuel cell 118 to produce electricity.

In some embodiments, the power generator 100 can include a heater controller. The heater controller can control the energizing of the heating element 130. In an example, the heater controller can control the energizing of the heating element 130 based on a demand for electricity. For instance, when a demand for electricity increases, the heater controller can energize the heating element 130, which heats the fuel 122 and produces hydrogen via thermolysis and thus electricity at the fuel cell 118. Alternatively, and/or in addition, when a demand for electricity decreases, the heater controller can de-energize the heating element 130, reducing the production of hydrogen via thermolysis and thus electricity.

In some embodiments, the heater controller can be configured to energize the heating element 130 when a demand for electricity surpasses electricity produced by the hydrolysis reaction occurring in the fuel cartridge 112. For example, energizing the heating element 130 can have a more immediate effect on an amount of hydrogen produced per unit of time than increasing the air flow with the fan 106 to cause more water vapor to permeate through the semipermeable membrane 120 and react with the fuel 122.

The sensors, heater controller, heating element 130, fan controller, and/or fan 106 can be powered by a power source 133. The power source 133 can be a battery and/or supercapacitor charged with electrical energy generated by the power generator 100.

In some embodiments, the fuel cartridge 112 can be divided into a plurality of cells, wherein each cell contains a heating element. For example, it may be beneficial to divide the fuel cartridge 112 into a plurality of cells when the fuel is an exothermic hydride (e.g., energy is released from the hydride during the thermolysis reaction). Dividing the fuel cartridge 112 into a plurality of cells can reduce the chances of and/or minimize the consequences of a thermal runaway. A thermal runaway can occur when an increase in temperature causes an increase in the exothermic reaction rate, which in turn causes an increase in temperature. In an example, through division of the fuel cartridge 112 into the plurality of cells, a thermal runaway that occurs in one cell can be confined to that particular cell. A division of the fuel cartridge 112 may not be necessary when using an endothermic fuel (e.g., energy is absorbed by the fuel).

Where the fuel cartridge 112 is divided into the plurality of cells, the heater controller can be configured to energize each of the heating elements that are included in each of the plurality of cells in unison. In an example, this can generate a uniform production of hydrogen from each of the plurality of cells. Alternatively, and/or in addition, the heater controller can be configured to energize each of and/or a group of the heating elements individually. This can be beneficial when an individual cell and/or group of cells is operating at a different temperature than other cells and needs to be individually adjusted and/or adjusted as a group.

Figure 1B:
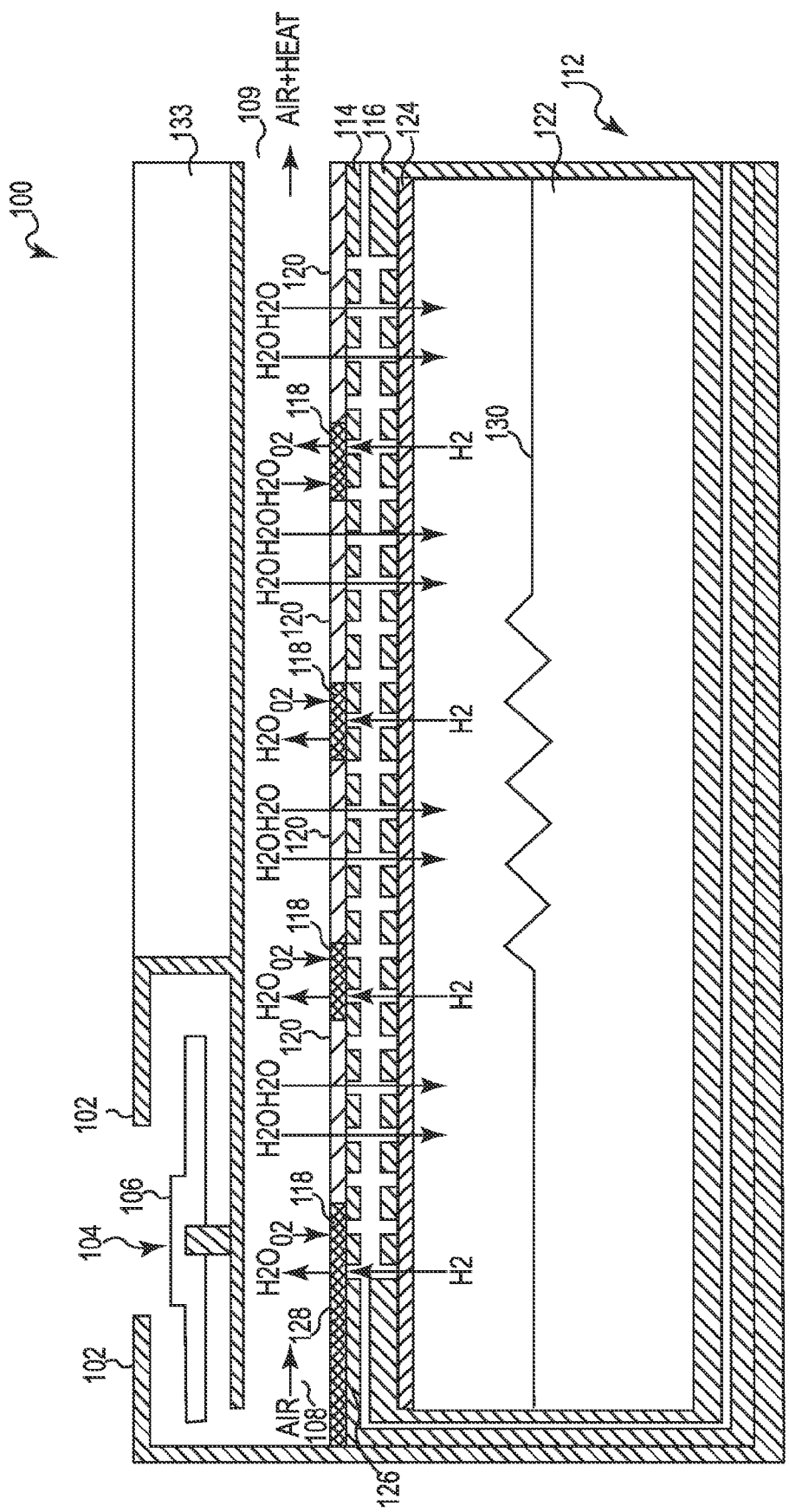
FIG. 1B illustrates a cross-sectional view of a power generator according to one or more embodiments of the present disclosure.

FIG. 1B illustrates a cross-sectional view of a power generator according to one or more embodiments of the present disclosure. As discussed in relation to FIG. 1A, power generator 100 can include a housing 102 that includes an air intake 104 and a fan 106, powered by power source 133, to direct air through the air intake through air conduit 108. The air conduit 108 can be disposed about a fuel cartridge 112 in the housing 102. In contrast to FIG. 1A, the power generator 100 in FIG. 1B can include one air conduit 108 as opposed to two air conduits, as shown in FIG. 1A.

As such, on one side of the fuel cartridge 112, air conduit 108, can include a fuel cell portion 118 and a selectively permeable membrane 120. In an example, the air conduit 108 can be configured to direct oxygen from the air intake 104 to the fuel cell portion 118 and water vapor from the air intake 104 to the selectively permeable membrane 120.

The selectively permeable membrane 120 can be formed from a water vapor permeable, hydrogen impermeable membrane. For example, water vapor can permeate through the selectively permeable membrane while the selectively permeable characteristics of the membrane prevent the permeation of hydrogen that is produced from the water vapor contacting the fuel 122 encapsulated in the particulate filter 124 and/or heating of the fuel 122 with heating element 130.

The fuel cell portion 118 can consume the hydrogen produced via hydrolysis and thermolysis as well as oxygen from the air conduit 108 to produce electricity. In an example, hydrogen generated in the fuel cartridge 112 can be consumed at an anode 126 of the fuel cell portion 118 while oxygen in the air is consumed at a cathode 128 of the fuel cell portion 118. The fuel cell portion 118 can produce water vapor and heat when reacting with the hydrogen and oxygen, as well as electricity. The water vapor and heat can be carried downstream by the air driven by fan 106.

Some of the water vapor may proceed back to the fuel cartridge 112 for use in generating more hydrogen. For example, the selectively permeable membrane portion 120 can allow the water vapor to enter the fuel cartridge 112 and contact the fuel 122 in the fuel cartridge 112. Alternatively, and/or in addition, excess water vapor, air, and heat can be directed away from the fuel cartridge 112 out exhaust opening 109.

Figure 2:
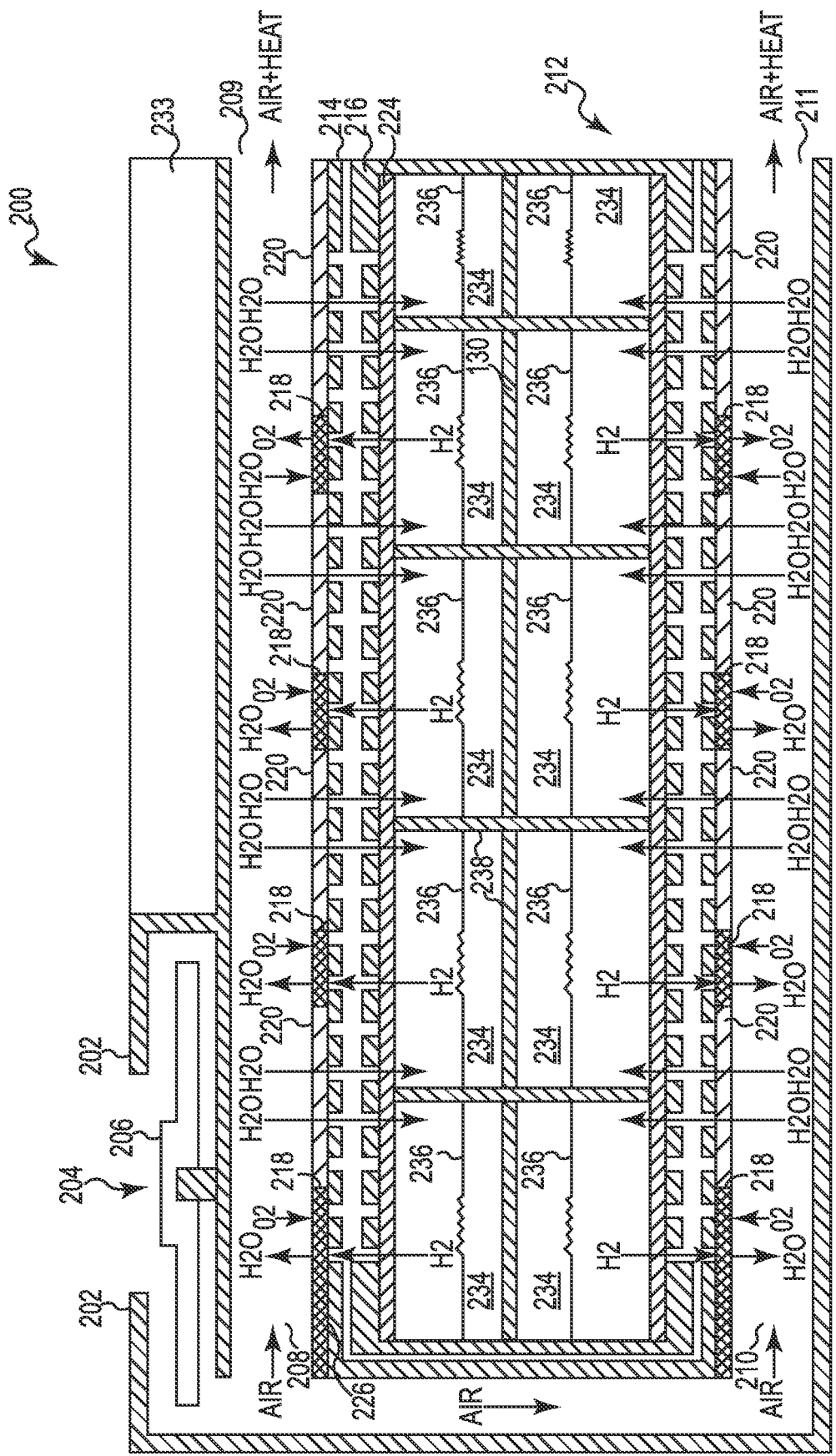
FIG. 2 illustrates a cross-sectional view of a power generator according to one or more embodiments of the present disclosure.

FIG. 2 illustrates a power generator according to one or more embodiments of the present disclosure. Power generator 200 includes a removable fuel cartridge 212 divided into a plurality of cells 234. In an example, each of the plurality of cells can contain a fuel and a heating element 236. For instance, each of the plurality of cells 234 can contain an endothermic and/or exothermic fuel. As discussed herein, when the power generator 200 includes an exothermic fuel, it may be beneficial to divide the exothermic fuel among the plurality of cells 234 to prevent a thermal runaway.

In some embodiments, a group of the plurality of cells 234 can contain an exothermic fuel and an alternate group of the plurality of cells 234 can contain an endothermic fuel. For example, an exothermic fuel and an endothermic fuel can be placed in alternating cells.

In some embodiments, the plurality of cells can be separated by partitions 238, which can be a part of and/or attached to a shell 216. In an example, the shell and/or partitions 238 can be formed from a metal and/or polymer that allows for handling of the fuel. The partitions 238 can be positioned such that the plurality of cells 234 are of the same dimensions. Alternatively, and/or in addition, the partitions can be placed such that each of the plurality of cells 234 and/or a group of the plurality of cells 234 are of a different dimension.

The power generator 200 can include a housing 202 that includes an air intake 204 for the intake of air by a fan 206. The housing 202 can be configured to receive the removable fuel cartridge 212. In some embodiments, the removable fuel cartridge 212 can be configured to slide into or out of a receptacle 214 within the housing 202 in a manner such as that discussed in relation to FIG. 1A.

In some embodiments, the fan 206 can direct air through an air conduit 208, 210. The air conduit 208, 210 can be disposed about the fuel cartridge 212 in the housing 202 that includes a fuel cell portion 218 and a selectively permeable membrane portion 220. In an example, the air conduit 208, 210 can be configured to direct the air from the air intake 204 across the fuel cell portion 218 and the selectively permeable membrane portion 220.

In some embodiments, selectively permeable membrane portion 220 can be a water vapor permeable, hydrogen impermeable membrane. As discussed herein, water vapor ($H_2O$) contained in the air can permeate through the selectively permeable membrane and pass through a particulate filter 224, contacting the fuel in the each of the plurality of cells 234. Upon contacting the fuel, hydrogen ($H_2$) can be produced via hydrolysis, and the hydrogen can pass back through the particulate filter 224. In an example, the selectively permeable membrane 220 can prevent the hydrogen from permeating through the selectively permeable membrane 220 because of the selectively permeable characteristics of the membrane.

In some embodiments, oxygen present in the air and the hydrogen can be consumed at the fuel cell portion 218, thus producing electricity. Upon the reaction of the oxygen and hydrogen at the fuel cell portion 218, water vapor and heat can be produced, which can be carried downstream past the selectively permeable membrane 220 through the air conduit 208, 210 via the air driven by the fan 206. Some of the water vapor carried downstream can permeate through the selectively permeable membrane 220 and contact the fuel while excess water vapor, air, and heat can be directed away from the fuel cartridge out exhaust opening 209, 211.

In some embodiments, the power generator 200 can include a temperature sensor in each of the plurality of cells 234 of the removable fuel cartridge 212. By including a temperature sensor in each of the plurality of cells 234, the temperature of each cell can be monitored and/or communicated to a temperature controller coupled to the temperature sensors. The temperature controller can be configured to control a temperature of each of the heating elements 236.

In an example, the temperature controller can be coupled to a power source 233, which can provide power for energizing the heating elements 236. Alternatively, and/or in addition, the power source 233 can be coupled to a fan controller configured to provide power to the fan 206.

In some embodiments, the amount of electricity produced by the power generator 200 can be controlled through operation of the fan 206 and the heating elements 236. For example, the temperature controller and/or fan controller can be configured to energize each of the plurality of heating elements and/or the fan based on an electricity demand.

By controlling the amount of air that passes through the air conduit 208, 210, an amount of water vapor that passes through the air conduit 208, 210 and over the selectively permeable membranes 220 can be increased or decreased. As such, the amount of water permeating through the selectively permeable membranes 220 and contacting the fuel can increase or decrease resulting in an increase or decrease in hydrogen production and thus an increase or decrease in production of electricity.

Alternatively, and/or in addition, by controlling the temperature of the heating elements 236, hydrogen production can be increased or decreased. For example, increasing the temperature of the heating elements 236 can result in increased production of hydrogen while decreasing the temperature of the heating elements can result in decreased production of hydrogen, thus resulting in an increase or decrease in production of electricity. As such, the power generator can adapt to varying electricity demands.

Figure 3:
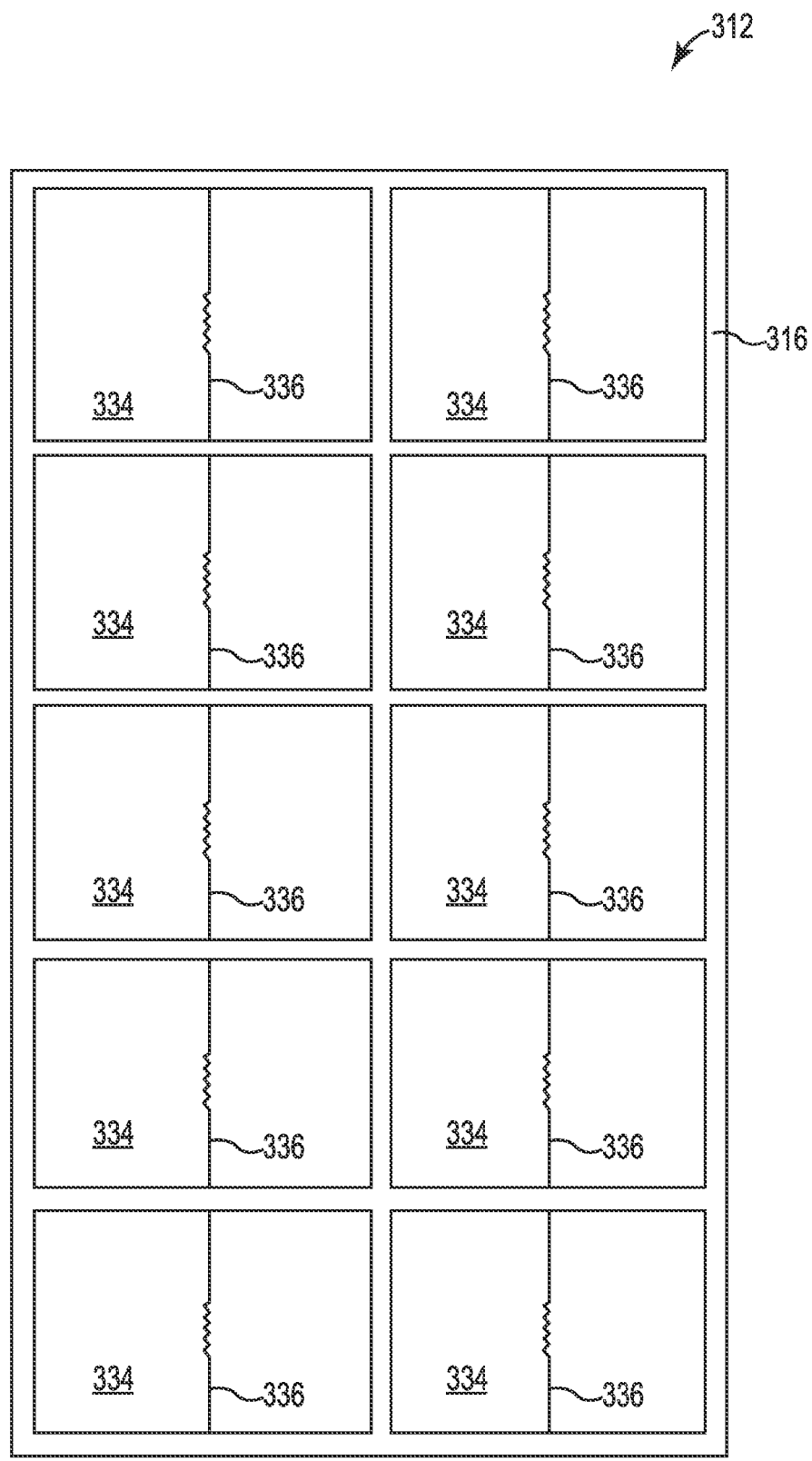
FIG. 3 illustrates a top-sectional view of a removable fuel cartridge according to one or more embodiments of the present disclosure.

FIG. 3 illustrates a top-sectional view of a removable fuel cartridge according to one or more embodiments of the present disclosure. Removable fuel cartridge 312 can include a plurality of cells 334 filled with a fuel. The fuel can be exothermic and/or endothermic. When the fuel is exothermic, it may be beneficial to divide the exothermic fuel among the plurality of cells 334 to prevent a thermal runaway, as discussed herein. When the fuel is endothermic, the fuel can be placed in one cell, as shown in FIG. 1A.

In some embodiments, the removable fuel cartridge 312 can include a shell 316 that forms a boundary of the removable fuel cartridge 312. Alternatively, and/or in addition, when the removable fuel cartridge 312 includes the plurality of cells 334, the shell 316 can form a boundary between each of the plurality of cells 334.

In some embodiments, each of the plurality of cells 334 in the removable fuel cartridge 312 can contain heating element 336 configured to heat the fuel for producing hydrogen via thermolysis. The heating elements can be controlled in unison via a temperature controller and/or can be controlled individually via the temperature controller.

Figure 4:
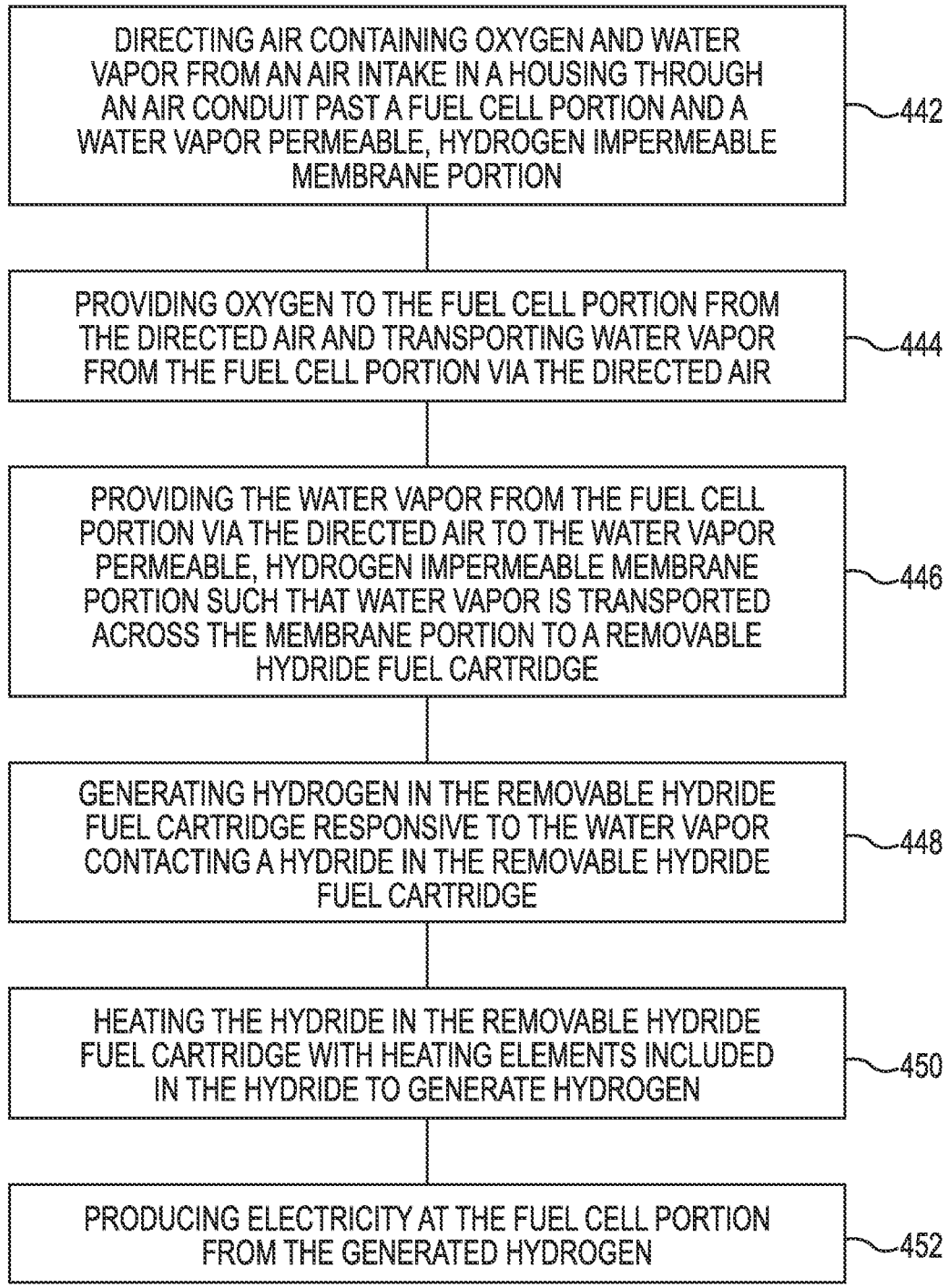
FIG. 4 illustrates a method for generating power according to one or more embodiments of the present disclosure.

FIG. 4 illustrates a method for generating power according to one or more embodiments of the present disclosure. The method includes directing air containing oxygen and water vapor from an air intake in a housing through an air conduit past a fuel cell portion and a water vapor permeable, hydrogen impermeable membrane portion, at block 442. The air intake can include a fan positioned in the air intake. A speed of the fan can be controlled by a fan controller that is coupled to the fan. By controlling the speed of the fan, an amount of oxygen and water vapor directed through the air conduit and past the fuel cell portion and water vapor permeable, hydrogen impermeable membrane portion can be controlled.

In some embodiments, the water vapor can permeate through the water vapor permeable, hydrogen impermeable membrane portion and contact a fuel contained in a removable fuel cartridge. Upon contacting the fuel, the water vapor can react with the fuel to produce hydrogen, which can then be reacted at the fuel cell portion with oxygen to produce electricity, heat, and water vapor.

At block 444, the method includes providing oxygen to the fuel cell portion from the directed air and transporting water vapor from the fuel cell portion via the directed air. As discussed herein, oxygen can be provided to the fuel cell portion via the directed air and reacted at the fuel cell portion to produce electricity, heat, and water vapor. The heat and water vapor can then be transported from the fuel cell portion by the directed air.

The method includes, at block 446, providing the water vapor from the fuel cell portion via the directed air to the water vapor permeable, hydrogen impermeable membrane portion such that water vapor is transported across the membrane portion to a removable fuel cartridge. Some of the water that is produced at the fuel cell portion can be transported by the directed air across the water vapor permeable, hydrogen impermeable membrane portion and can permeate through the membrane portion and contact a fuel within the removable fuel cartridge.

At block 448, the method includes generating hydrogen in the removable fuel cartridge responsive to the water vapor contacting the fuel in the removable fuel cartridge. In an example, hydrogen can be produced via a hydrolysis reaction that involves the water vapor reacting with the hydride in the removable fuel cartridge.

The method includes heating the fuel in the removable fuel cartridge with heating elements included in the hydride to generate hydrogen, at block 450. In an example, heating the fuel can cause a chemical decomposition of the hydride, which produces hydrogen.

At block 452, the method includes producing electricity at the fuel cell portion from the generated hydrogen. In an example, the hydrogen can be reacted at an anode of the fuel cell portion and oxygen can be reacted at a cathode of the fuel cell portion to produce electricity, heat, and water vapor.

In some embodiments, the method can include exhausting heat produced from the reaction of oxygen and hydrogen at the fuel cell and air from the air conduit. For example, the air conduit can include an exhaust opening configured to direct air and heat away from the fuel cartridge.

In some embodiments, the method can include sensing a pressure inside the removable fuel cartridge and controlling a speed of a fan positioned in the air intake and a temperature of the heating elements included in the fuel based on the sensed pressure. As discussed herein, generation of hydrogen and thus production of electricity can be controlled by controlling the speed of the fan and the temperature of the heating elements included in the fuel.

In an example, a current and/or voltage sensor can detect a current and/or voltage produced by the fuel cell portion and can communicate the information to a fan controller or temperature controller. The fan controller and/or temperature controller can increase or decrease the speed of the fan and/or the temperature of the heating elements to increase or decrease an amount of electricity produced, as discussed herein. As such, the current and/or voltage produced by the fuel cell can be adjusted.

In some embodiments, the fan and/or battery can be powered from a power source. In an example, the power source can be a rechargeable battery and/or supercapacitor.

In some embodiments, the rechargeable battery and/or supercapacitor can be charged with electricity generated by the fuel cell. By using electricity generated by the fuel cell to charge the rechargeable battery and/or supercapacitor, a connection to an external power source can be avoided.

In some embodiments, the method can include sensing a pressure in the fuel cartridge, sensing a temperature in the fuel cartridge, and adjusting the temperature of the heating elements based on the sensed pressure in the fuel cartridge and the sensed temperature in the fuel cartridge. In an example, upon generating electricity, the pressure in the removable fuel cartridge and/or the temperature in the removable fuel cartridge can increase.

For instance, the pressure and/or temperature in the removable fuel cartridge can increase to a point where the removable fuel cartridge can rupture. To avoid this scenario, the temperature controller can be in communication with the pressure and temperature sensors and can adjust the temperature of the heating elements to decrease or increase the temperature of the heating elements to a level that maintains the pressure and temperature of the removable fuel cartridge at a safe level.

In some embodiments, the method can include sensing a relative humidity of air entering the air conduit and adjusting a fan speed of the fan based on the sensed relative humidity. Since the removable fuel cartridge can produce electricity by reaction of water vapor with the fuel, the relative humidity of air (e.g., water content of the air) can impact the production of electricity. As such, a relative humidity sensor can be in communication with the fan controller and the fan controller can adjust the speed of the fan to increase or decrease an amount of air pushed through the air conduit and over the water vapor permeable, hydrogen impermeable membrane portion.

For example, when the relative humidity of the air decreases, the fan controller can increase the speed of the fan to push more air at the lower relative humidity through the air conduit and over the water vapor permeable, hydrogen impermeable membrane portion. Alternatively, and/or in addition, when the relative humidity of the air increases, the fan controller can decrease the speed of the fan to push less air at the higher relative humidity through the air conduit and over the water vapor permeable, hydrogen impermeable membrane portion.

Figure 5:
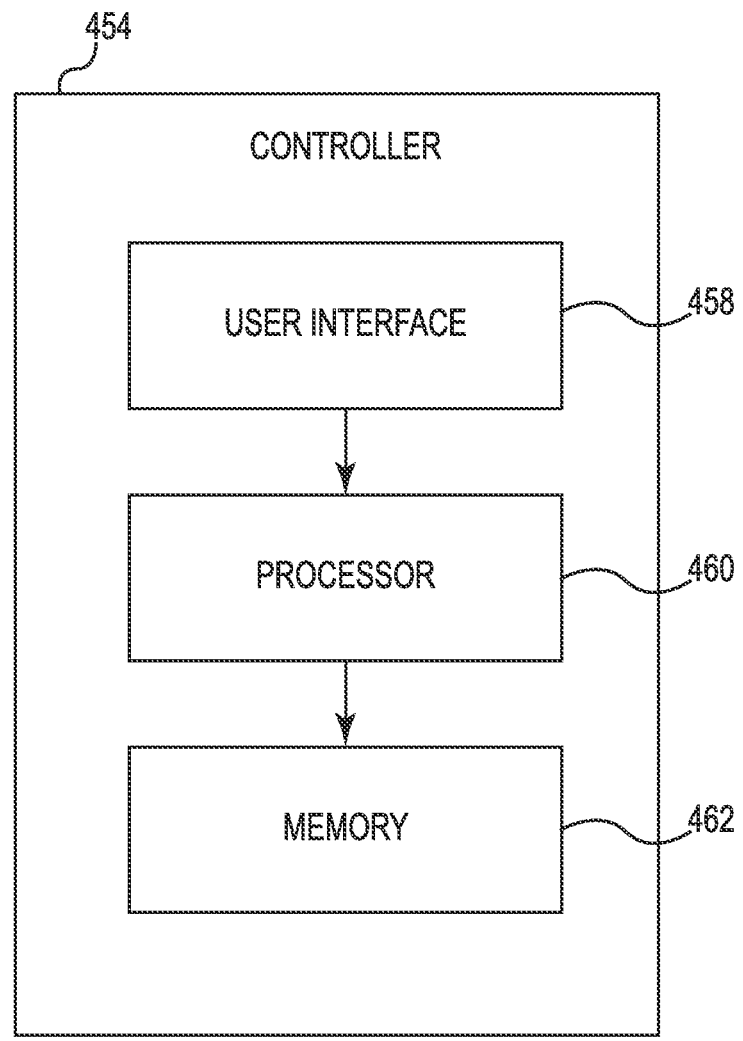
FIG. 5 illustrates a block diagram of a controller according to the present disclosure.

FIG. 5 illustrates a block diagram of a controller according to the present disclosure. In an example, the example controller 454 can be a fan controller and/or a temperature controller.

As shown in FIG. 5, controller 454 includes a user interface 458. User interface 458 can be a graphic user interface (GUI) that can provide (e.g., display and/or present) and/or receive information (e.g., data and/or images) to and/or from a user (e.g., operator) of controller 454. For example, user interface 458 can include a screen that can provide information to a user of controller 454 and/or receive information entered into a display on the screen by the user. However, embodiments of the present disclosure are not limited to a particular type of user interface.

As shown in FIG. 5, controller 454 includes a processor 460 and a memory 462 coupled to the processor 460. Memory 462 can be volatile or nonvolatile memory. Memory 462 can also be removable (e.g., portable) memory, or non-removable (e.g., internal) memory. For example, memory 462 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 462 is illustrated as being located in controller 454, embodiments of the present disclosure are not so limited. For example, memory 462 can also be located internal to another computing resource (e.g., enabling computer readable instructions to be downloaded over the Internet or another wired or wireless connection).

Memory 462 can also store executable instructions, such as, for example, computer readable instructions (e.g., software), for controlling a temperature of a heating element and/or a speed of a fan in accordance with one or more embodiments of the present disclosure.

Processor 460 can execute the executable instructions stored in memory 462 in accordance with one or more embodiments of the present disclosure. For example, processor 460 can execute the executable instructions stored in memory 462 to increase a speed of the fan based on a sensed relative humidity.

In some embodiments controller 454 can be in communication with sensors. For example, controller 454 can be in communication with temperature, pressure, and/or relative humidity sensors. Alternatively, and/or in addition, the controller 454 can be in communication with a fan and/or heating element. Based on signals received by the controller from the temperature, pressure, and/or relative humidity sensors, the controller 454 can increase or decrease a speed of the fan and/or temperature of the heating element.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A power generator comprising:
    a removable fuel cartridge containing a fuel and a heating element producing an increase or decrease of heat;
    a housing that includes an air intake, wherein the housing is configured to receive the removable fuel cartridge; and
    an air conduit disposed about the fuel cartridge in the housing that includes a fuel cell portion and a selectively permeable membrane portion and wherein the fuel cell portion and the selectively permeable membrane are proximate to each other, the air conduit positioned to direct the air from the air intake across the fuel cell portion and the selectively permeable membrane portion.

2. The power generator of claim 1, wherein the fuel cartridge is divided into a plurality of cells, wherein each cell contains a heating element.

3. The power generator of claim 1, further comprising a heater controller configured to energize each of the heating elements in unison.

4. The power generator of claim 1, further comprising a heater controller configured to energize each of the heating elements individually.

5. The power generator of claim 1, further comprising a heater controller configured to energize the heating element when a demand for electricity surpasses electricity produced by a hydrolysis reaction occurring in the fuel cartridge.

6. The power generator of claim 1, wherein the housing further comprises an exhaust opening configured to direct air and heat away from the fuel cartridge.

7. The power generator of claim 1, wherein:
the fuel cartridge is divided into a plurality of cells;
each of the plurality of cells is filled with a fuel; and
each of the plurality of cells includes a heating element.

8. The power generator of claim 1, further comprising:
a temperature sensor in each of a plurality of cells of the removable fuel cartridge; and
a temperature controller coupled to the temperature sensors configured to control a temperature of each of the heating elements.

9. The power generator of claim 8, wherein the temperature controller is configured to energize each of the plurality of heating elements based on an electricity demand.

10. The power generator of claim 1, wherein the selectively permeable membrane is a water vapor permeable, hydrogen impermeable membrane.

11. The power generator of claim 1, further comprising:
wherein the heating element is configured to increase or decrease heat to a fuel located in the fuel cartridge to cause a release of hydrogen from the fuel.

12. The power generator of claim 1, further comprising:
wherein the air conduit is positioned to direct oxygen from the air intake to the fuel cell portion and to carry water vapor generated by the fuel cell portion past the selectively permeable membrane portion such that water vapor passes through the selectively permeable membrane portion and causes release of hydrogen from the fuel cartridge.

13. A power generator, comprising:
a housing that includes an air intake;
a fuel cartridge adapted to be removably placed within the housing, wherein the fuel cartridge includes a heating element configured to increase or decrease heat to a fuel located in the fuel cartridge to cause a release of hydrogen from the fuel;
an air conduit disposed about the fuel cartridge in the housing, wherein:
the air conduit includes a fuel cell portion and a selectively permeable membrane portion and wherein the fuel cell portion and the selectively permeable membrane are proximate to each other;
the air conduit is positioned to direct oxygen from the air intake to the fuel cell portion and to carry water vapor generated by the fuel cell portion past the selectively permeable membrane portion such that water vapor passes through the selectively permeable membrane portion and causes release of hydrogen from the fuel cartridge; and
a fan positioned in the air intake coupled to a fan controller configured to control operation of the fan.

14. The power generator of claim 13, wherein the fan controller controls operation of the fan based on outputs from relative humidity, pressure, and temperature sensors positioned in the housing.

15. The power generator of claim 13, wherein the fan controller controls operation of the fan based on electricity demand.

16. A method for generating power, comprising:
directing air containing oxygen and water vapor from an air intake in a housing through an air conduit past a fuel cell portion and a water vapor permeable, hydrogen impermeable membrane portion and wherein the fuel cell portion and the selectively permeable membrane are proximate to each other;
providing oxygen to the fuel cell portion from the directed air and transporting water vapor from the fuel cell portion via the directed air;
providing the water vapor from the fuel cell portion via the directed air to the water vapor permeable, hydrogen impermeable membrane portion such that water vapor is transported across the membrane portion to a removable fuel cartridge;
generating hydrogen in the removable fuel cartridge responsive to the water vapor contacting a fuel in the removable fuel cartridge;
heating the fuel in the removable fuel cartridge with heating elements included in the fuel to generate hydrogen; and
producing electricity at the fuel cell portion from the generated hydrogen.

17. The method of claim 16, further comprising exhausting air and heat from the air conduit.

18. The method of claim 16, further comprising:
sensing a pressure inside the fuel cartridge; and
controlling a speed of a fan positioned in the air intake and a temperature of the heating elements included in the fuel based on the sensed pressure.

19. The method of claim 16, further comprising powering the fan and the heating elements from a rechargeable battery.

20. The method of claim 16, further comprising:
sensing a pressure in the removable fuel cartridge,
sensing a temperature in the removable fuel cartridge; and
adjusting the temperature of the heating elements based on the sensed pressure in the removable fuel cartridge and the sensed temperature in the removable fuel cartridge.

21. The method of claim 16, further comprising:
sensing a relative humidity of air entering the air conduit; and
adjusting a fan speed based on the sensed relative humidity.

* * * * *